W. MALLERD.
Gas Regulator.
No. 932. Reissued March 20, 1860.
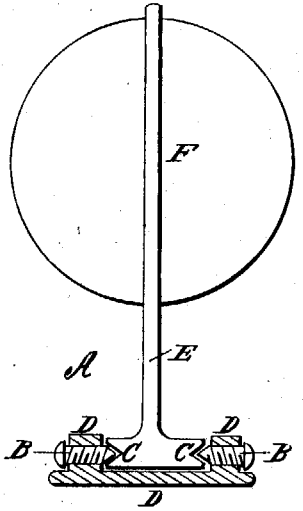
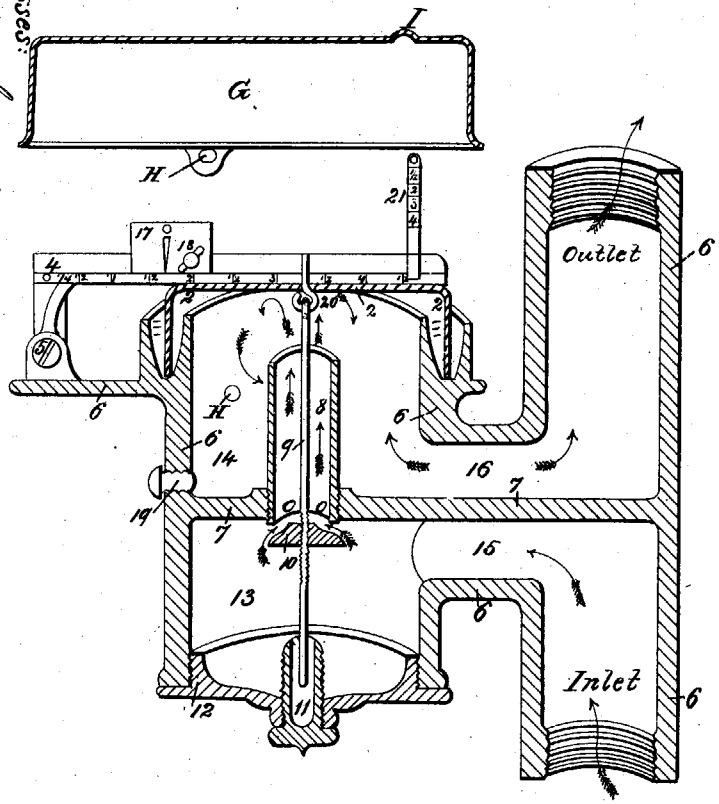
Witnesses:
Jas. H. Porter
J. C. Sowler
Inventor;
William Mallerd
N. PETERS, Photo-Lithographer, Washington, D. C.

UNITED STATES PATENT OFFICE.

WILLIAM MALLERD, OF BRIDGEPORT, CONNECTICUT.

IMPROVEMENT IN GAS-REGULATORS.

Specification forming part of Letters Patent No. 21,765, dated October 12, 1858; Reissue No. 93 2, dated March 20, 1860.

*To all whom it may concern:*

Be it known that I, WILLIAM MALLERD, of the city of Bridgeport, in the county of Fairfield and State of Connecticut, have invented certain Improvements, which are new and useful, in Gas-Regulators; and I do hereby declare that the following is a full, clear, and exact description of the same, reference being had to the annexed drawings, making a part of this specification, in which—

Figure 1 represents a vertical central section of a gas-regulator constructed according to my improvement. Fig. 2 (or letter A) is a sectional plan or top view of the cup (or gasometer) and lever, which serves to regulate the pressure of the gas. Fig. 3 (or letter G) is a side elevation of the cover detached.

This invention consists in regulating the pressure of the gas in the discharge-pipes independent from the pressure in the supply-pipes by means of a sliding weight on a graduated lever pressing on an inverted cup, (or gasometer,) which is raised by the gas as soon as the pressure of the same reaches the desired point, and which lever is connected with a valve in such a manner that by raising the lever the valve is closed and the supply of gas stopped until the pressure against the inverted cup is reduced again below the desired point, when the valve opens and admits a fresh supply; and in combination with the above the invention further consists in effecting the communication between the supply-pipes and the inverted cup, by means of a small tube contracted at the top, (or upper end,) so that all impurities or condensable matter contained in the gas is deposited at the sides of said tube without being able to interfere with the working parts of the regulator, and the upper end of said tube 8 is carried close up to the under side of gasometer, so the gas can act more prompt in raising the same and close the valve, and also prevents any mercury from running down into the gas-meter that might accidentally be spilled over from the reservoir; and the invention further consists in arranging a stud on the top of the lever for the purpose of ascertaining the flow of the gas from the outside without opening the gas-regulator.

To enable those skilled in the art to fully understand and construct my improvements, I will proceed to describe the same.

A vessel, 6 6 6, of cast-iron or any suitable metal, is divided by a partition, 7, into two compartments, 13 and 14, the lower one of which communicates by a passage, 15, with the supply-pipe leading to the gasometer, while the other one communicates by a similar passage, 16, with the discharge-pipe leading to the gas-burners. The bottom 12 of the lower compartment is screwed on, and it can easily be taken out to clean and remove tar and other impurities. The upper compartment, 14, is open at the top, and an inverted cup, (or gasometer,) 2 2, red lines, is placed over it, which rests in a recess (or reservoir) marked ═ at the outer side of the vessel, 6 6. This recess (or reservoir) is filled with mercury or other suitable liquid, so as to prevent the escape of gas from the reservoir ═, and the outer edge of the reservoir is lower than the inner one, so that tar and other impurities which may be deposited in this low reservoir will flow over the outer edge without reaching high enough to enter into the compartment 14, and both edges being lower than the top of the gasometer, so that any deposit may be carried off and not disarrange the working of same. An arm, 6, extends from the vessel 6 6, carrying two ears, 5, between which a lever, 4, is hinged, and a weight, 17, slides on the upper part of this lever, and it may be adjusted on the same by means of a thumb-screw, 18. The lever is graduated according to the common water-gage used for measuring the pressure of gas, and if the weight 17 is fastened at the mark 2 on the lever, for instance, it will require two inches of pressure to raise the gasometer. The manner in which this lever is attached is clearly represented in Fig. 2, (or letter A,) where F represents the gasometer, E the lever, D D the ears through which two pointed screws B B work into recesses C C, so that the lever E works quite free and easy. A rod, 9, with a hook, 20, is attached to the lever 4, extending down into the chamber 14, and through the pipe 8. Communication between the two compartments 13 and 14 is effected by a small tube, 8, which is contracted at the upper end to a knife-edge, so that impurities which may be carried up by the gas are deposited on the outside of said tube, from whence they may be abstracted by a plug, 19. The lower end of tube 8 forms a valve-seat, O O, and a valve, 10, is attached to the rod 9 in such a manner that by raising the lever 4 the valve 10 closes the tube 8, and thereby the supply of gas is stopped. The valve 10 is adjusted on the rod 9 by a screw-thread cut upon said rod, and the lower end of this said rod is guided by a socket, 11, which is filled with mercury or other suitable liquid, so that the impurities deposited from the gas at the bottom of the compartment 13 are prevented from getting into the socket 11, whereby the rod might be caused to stick and prevented from working freely. A pin or stud, 21, is screwed into the top of the lever, and it extends through an opening, I, in the cover G, Fig. 3, so that it is easy to ascertain from the outside if any gas is flowing, or if the valve 10 is closed. The cover G is attached to the vessel 6 6 6 by means of ears H, corresponding to opening H in the side of the vessel 6 6.

The operation is as follows: The vessel 6 6 is placed between the supply and discharge pipe, and the pressure at which the gas is to be burned is determined by adjusting the weight 17 on the graduated lever 4. As soon as gas is admitted, and when the pressure of the gas in the gasometer 2 2 exceeds the desired point, the gasometer, together with the lever 4, is raised, and the valve 10 is drawn up into the seat O O and the supply of gas is cut off. As soon as the pressure of the gas in the gasometer is reduced again below the desired point, the weight 17 presses down the gasometer, and the valve 10 is opened, so that a fresh supply of gas is admitted. By pressing on the stud 21 it may be ascertained if the valve 10 is closed or open, and it may thereby be determined to a certain extent how much the pressure in the gasometer exceeds the desired pressure for consuming the gas.

I do not claim, broadly, the use of the rising and falling of the gasometer 2 2 for the purpose of regulating the pressure of the gas; but

Having thus described my invention, what I claim as new, and desire to secure by Letters Patent, is—

1. Arranging the graduated lever 4 with the adjustable weight 17, in combination with the gasometer 2 2 and the valve 10, in such a manner that by raising the gasometer the valve is closed and the supply of gas stopped, so that the pressure of the gas in the gasometer can be regulated by adjusting the weight 17.

2. In combination with the lever, gasometer, and reservoir, admitting the gas direct against the gasometer by means of a small tube, 8, which is contracted toward its upper end so that impurities carried up by the gas or any deposit will fall outside of said tube without being able to interfere with the working part of the gas-regulator.

3. Arranging the stud 21, in combination with the lever 4, rod 9, and valve 10, in such a manner that by depressing the stud 21 the supply of gas may be ascertained without raising the cover of the gas-regulator.

WILLIAM MALLERD.

Witnesses:

J. H. PORTER,

T. C. WORDIN.